Jan. 12, 1932. L. D. PENDER 1,840,602
FERTILIZER AND LIME SPREADER
Filed April 25, 1930 2 Sheets-Sheet 1
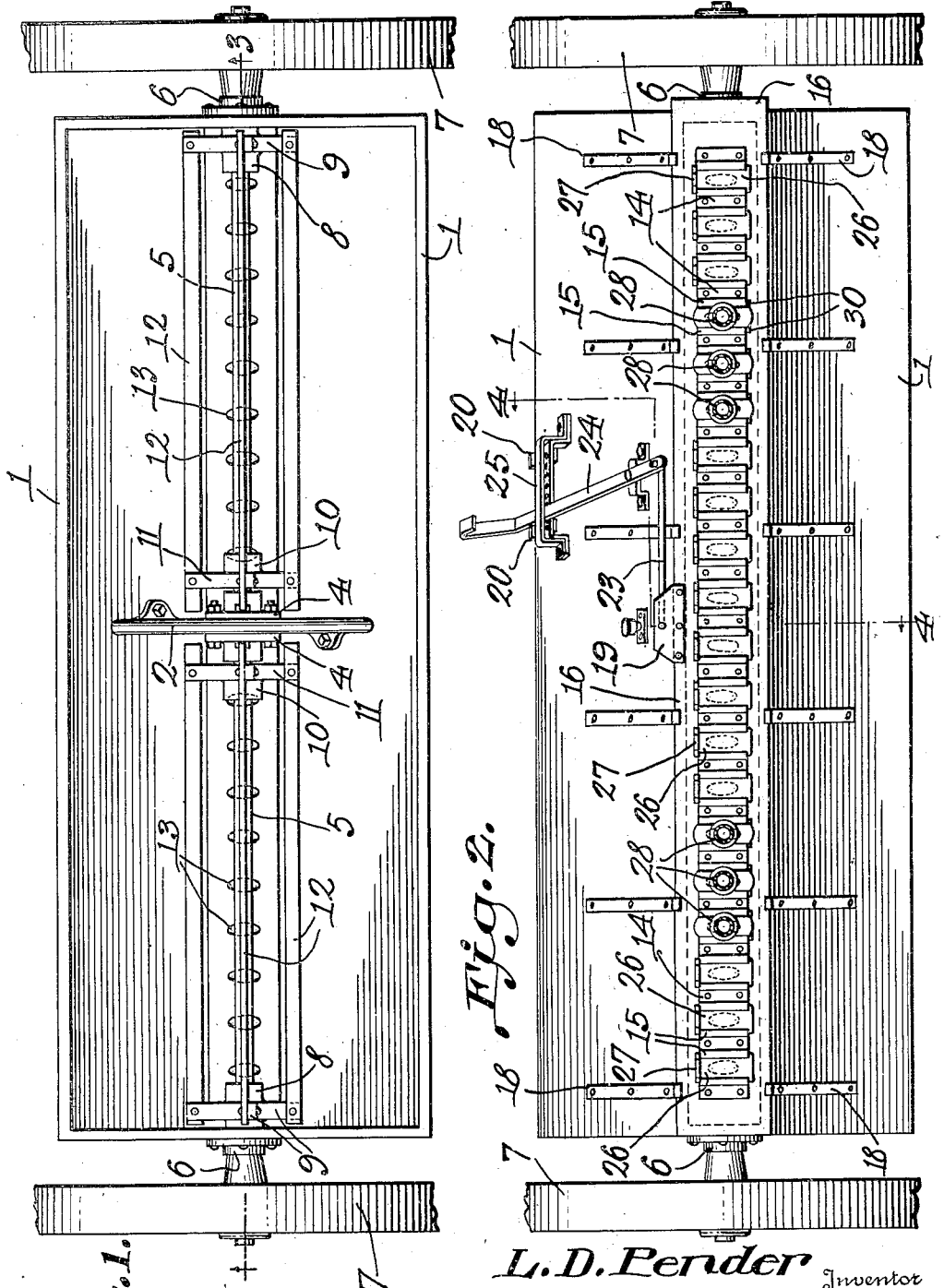

Jan. 12, 1932.　　　L. D. PENDER　　　1,840,602
FERTILIZER AND LIME SPREADER
Filed April 25, 1930　　2 Sheets-Sheet 2
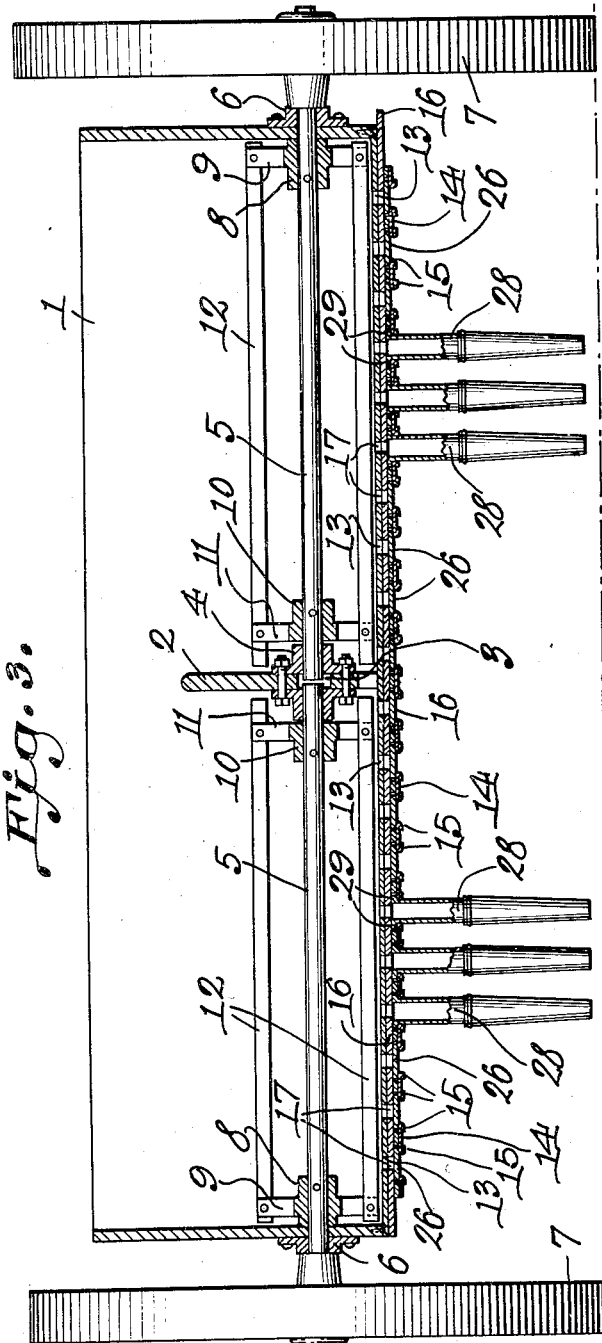
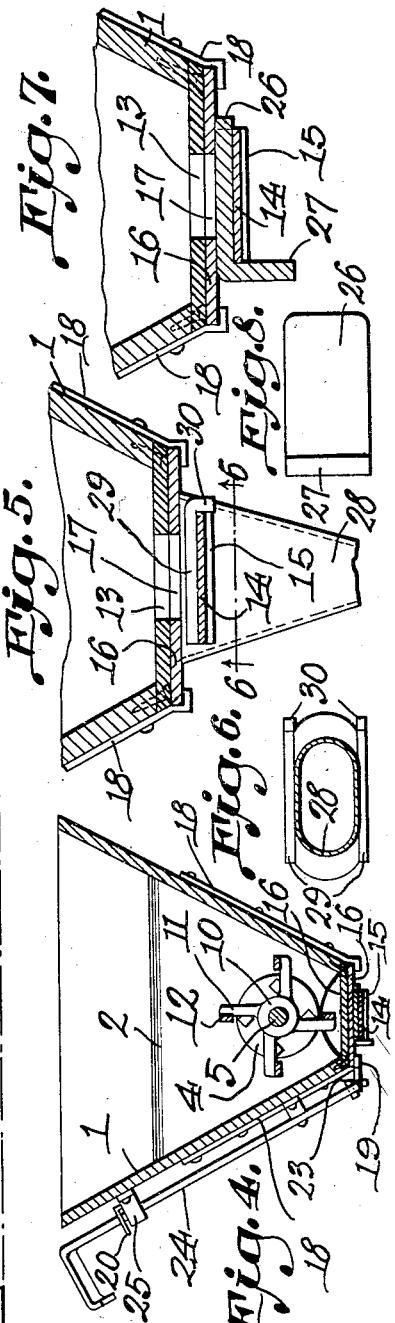

Patented Jan. 12, 1932

1,840,602

UNITED STATES PATENT OFFICE

LORENZO D. PENDER, OF TARBORO, NORTH CAROLINA, ASSIGNOR TO LORENZO D. PENDER, JR., OF TARBORO, NORTH CAROLINA

FERTILIZER AND LIME SPREADER

Application filed April 25, 1930. Serial No. 447,320.

This invention relates to a machine for spreading lime and fertilizer, one of the objects being to provide a structure of this type which is simple and efficient and can be adjusted readily so as to deposit the bulk material at any point desired, it being possible to deliver the material through spouts extending close to the ground or to scatter it.

Another object is to provide a means for lubricating the working parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a top plan view of the machine;

Figure 2 is a bottom plan view thereof, spouts shown suspended therefrom, said spouts being in section.

Figure 3 is a section on line 3—3, Figure 1.

Figure 4 is a section on line 4—4, Figure 2.

Figure 5 is a section through a portion of the hopper showing in side elevation the upper portion of a spout connected thereto.

Figure 6 is a section on line 6—6, Figure 5, showing the upper end of the spout.

Figure 7 is a view similar to Figure 5 showing a closure plate in position under one of the outlets.

Figure 8 is a bottom plan view of a closure plate.

Referring to the figures by characters of reference, 1 designates a hopper for holding the material to be spread over the surface of the ground. Secured in this hopper, adjacent to the center thereof, is a partition 2 having an opening 3. Secured to the side of this partition so as to extend across the opening 3 are bearing plates 4 which co-operate with the wall of opening 3 to provide a lubricating compartment through which lubricant can be supplied by any suitable means.

Journaled in each of the bearing plates 4 is the inner end of a shaft 5. Two of these shafts are used, the shafts being extended in opposite directions and disposed in alinement. The shafts project through the sides of the hopper 1 where bearings 6 are provided, and secured to the outer ends of the shafts are wheels 7.

Secured to each shaft adjacent to the side wall of the hopper 1 is a head 8 having radial arms 9, and a similar head 10 provided with radial arms 11 is secured to the other end portion of each shaft close to partition 2. The corresponding arms 9 and 11 on each shaft are connected by agitating strips 12 which rotate with the shaft and travel close to the bottom of the hopper.

Formed within the bottom of the hopper is a longitudinal series of outlet openings 13.

Slidably mounted on the lower surface of the bottom of the hopper is a valve plate 16 having apertures 17 adapted to register with the outlets 13 when the plate is in one position. This plate which is supported by straps 18, can be actuated by any suitable means. For example, a bracket 19 can project therefrom and a rod 23 connected at one end to this bracket while its other end is pivotally connected to the lower end of a lever 24. This lever is extended upwardly through a guide bracket 25 to a point where it can easily be grasped and actuated by the operator. Adustable stop plates 20 are mounted in this bracket for limiting the movement of lever 24. Thus plate 16 can be shifted to control the discharge of material from the hopper through openings 13.

The apertures 17 are normally closed by plates 26 which are adapted to be slidably supported on flanges 15 extending from guide flanges 14 on plate 16. These plates 26 can be readily actuated to move them into or out of position beneath the outlets.

For the purpose of directing bulk material to desired points on the surface of the ground, outlet spouts 28 are used. Each of these spouts has a flange 29 at its upper end and by placing a spout beneath one of the apertures 17 after a plate 26 has been removed, the flange 29 can be caused to engage flanges 15 so that the spout will thus be supported as shown for example in Figure 5. The flanges can be provided with depending ears 30 to facilitate movement of the spouts into and out of position. The flanges 15 are so shaped and located that each pair of them provides a receiving channel of substantially the same size and shape as the plates 26 and the upper ends of the spouts. Thus the spouts and plates can be used interchangeably.

Obviously the spouts can be placed under any of the apertures 17 desired and the remaining openings will be kept closed by their plates 26. Any desired number of outlet spouts can be used. By removing the spouts and some of the plates the bulk material can be discharged directly through the openings onto the ground.

By means of the valve plate 16 the discharge of material through the openings 13 can be controlled at all times, it being understood that when plate 16 is shifted the spouts and all other parts carried thereby will also be shifted.

By providing a lubricant in the opening 3 the ends of the shaft 5 can be properly lubricated at all times, and the lubricant will, at the same time, be protected from dirt.

Either or both fertilizer and lime can be used in this machine.

By locating the valve plate 16 outside of the hopper its operation will not be stopped by bulk material packing therearound. Instead, any material entering between the parts will be able to work out and drop to the ground.

What is claimed is:

1. A distributor of the class described including a hopper having a longitudinal series of outlets, an apertured valve plate movably mounted upon the bottom surface of the hopper for controlling the flow of material through the outlets, supporting elements connected to the bottom face of the valve plate adjacent to the apertures, and means removably engaging said elements and beneath the respective apertures for controlling the flow of material therethrough.

2. A distributor of the class described including a hopper having a longitudinal series of outlets, an apertured slide valve plate upon the bottom surface of the hopper for controlling the flow of material through the outlets, supporting elements arranged in pairs upon the bottom surface of the valve plate adjacent to the apertures in the valve plate, and means slidable into and out of engagement with said elements and supported by the valve plate for controlling the flow of material through the valve plate.

3. A distributor of the class described including a hopper having a longitudinal series of outlets, an apertured slide valve upon the bottom surface of the hopper for controlling the flow of material through the outlets, supporting elements arranged in pairs upon the bottom surface of the valve and adjacent to the apertures in the valve, and means slidable into and out of engagement with said elements and supported by and movable with the valve for controlling the flow of material through the valve apertures, each of said means including a spout and flanges on the spout for engagement with the supporting elements.

4. A distributor of the class described including a hopper having a longitudinal series of outlets, an apertured slide valve upon the bottom surface of the hopper for controlling the flow of material through the outlets, supporting elements arranged in pairs upon the bottom surface of the valve and adjacent to the apertures in the valve, and means slidable into and out of engagement with said elements and supported by and movable with the valve for controlling the flow of material from the apertures in the valve, an actuating lever outside of the hopper, and means outside of the hopper and controlled by the lever for shifting the valve plate.

5. A fertilizer distributor including a hopper having a plurality of outlets, a plate slidably engaging the bottom surface of the bottom of the hopper and having apertures movable into and out of register with the respective outlets, a plurality of spouts and plates, and means upon the lower surface of the apertured plate forming channels of substantially the same size and shape as the plates and the upper ends of the spouts for removably receiving the same, said spouts and plates being interchangeable in the supporting means to close selected outlets and leave the remaining outlets open for the discharge of material into the spouts thereunder.

6. A fertilizer distributor including a hopper having a plurality of outlets, a plurality of plates, a plurality of spouts, and means adjacent to the outlets forming channels of substantially the same size and shape as the plates and the upper ends of the spouts for removably receiving the same, said spouts and plates being interchangeable to close pre-determined outlets and to release material through the remaining outlets to the spouts.

In testimony that I claim the foregoing as my own, I have hereto affixed my signature.

LORENZO D. PENDER.